Feb. 2, 1943. J. H. PERONI 2,309,977
ARTIFICIAL TREE
Filed March 5, 1941 2 Sheets-Sheet 1

INVENTOR.
JOHN H. PERONI
BY Clark & Ott
ATTORNEYS

Feb. 2, 1943.                J. H. PERONI                2,309,977
                            ARTIFICIAL TREE
                         Filed March 5, 1941        2 Sheets-Sheet 2
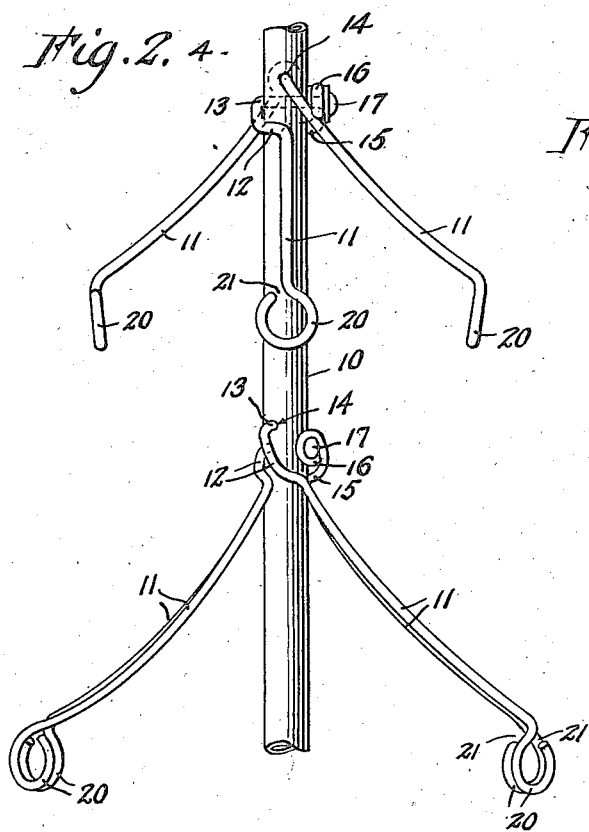
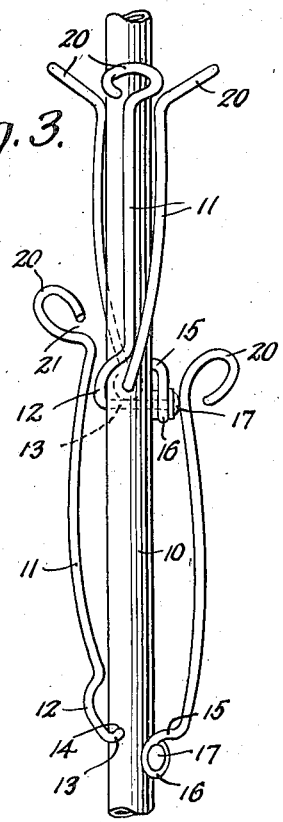
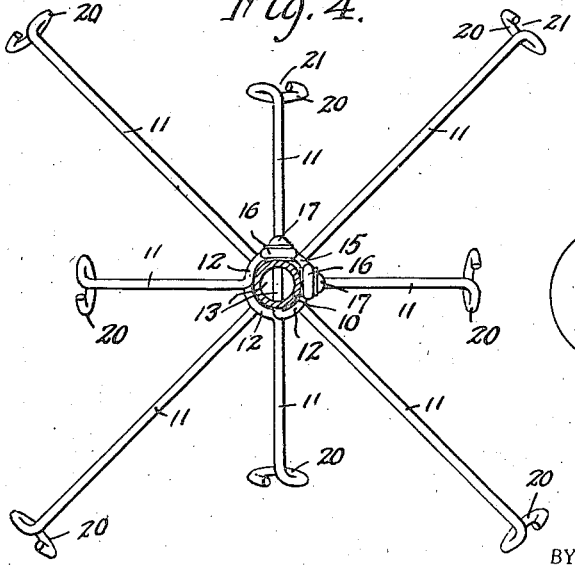
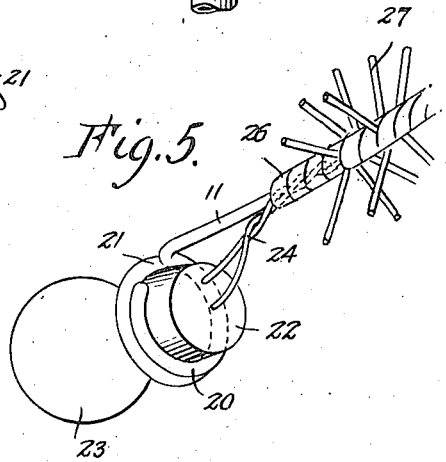
INVENTOR.
JOHN H. PERONI
Clark r Ott
ATTORNEYS Patented Feb. 2, 1943

2,309,977

UNITED STATES PATENT OFFICE 2,309,977

ARTIFICIAL TREE

John H. Peroni, Freeport, N. Y.

Application March 5, 1941, Serial No. 381,795

2 Claims. (Cl. 41—15)

This invention relates to artificial trees which are especially designed for outdoor decorative purposes during holiday seasons and the same is more particularly directed to an improved decorative artificial tree which is so constructed and arranged as to permit of the collapsing of the branches with reference to the trunk in order to reduce the overall size and thereby facilitate storage and shipment thereof in a compact arrangement.

The invention provides an arrangement of trunk and branches by means of which the branches are movable from a projecting radial relation with the trunk to a collapsed longitudinal relation therewith and in which the outer ends of the branches are nested between the adjacent upper branches.

More particularly the invention resides in an artificial tree frame embodying a trunk and vertically spaced groups of branches carried thereby in which the groups are respectively composed of a plurality of pairs of branches in each group with interengaging means at the inner terminals of each pair for connecting the branches with the trunk to permit of independent movement of the branches from an active position projecting radially outward from the trunk to an inactive collapsed position extending axially thereof.

The invention further includes, in an artificial tree of the indicated character, looped terminals at the ends of the branches in which are received electrical sockets for containing lamps for illuminating the tree.

With the foregoing and other objects in view, reference is now made to the following specification and accompanying drawings in which there is illustrated the preferred form of the invention.

In the drawings:

Fig. 2 is an enlarged fragmentary side view of the tree frame showing several groups of branches with the same disposed in active relation to the trunk.

Fig. 3 is a similar view showing the branches in collapsed inactive relation to the trunk.

Fig. 4 is a sectional plan view taken approximately on the line 4—4 of Fig. 2.

Fig. 5 is an enlarged perspective view of the outer end of one of the branches with the lamp and wiring applied and illustrating means of decorating the branch.

Figure 1:
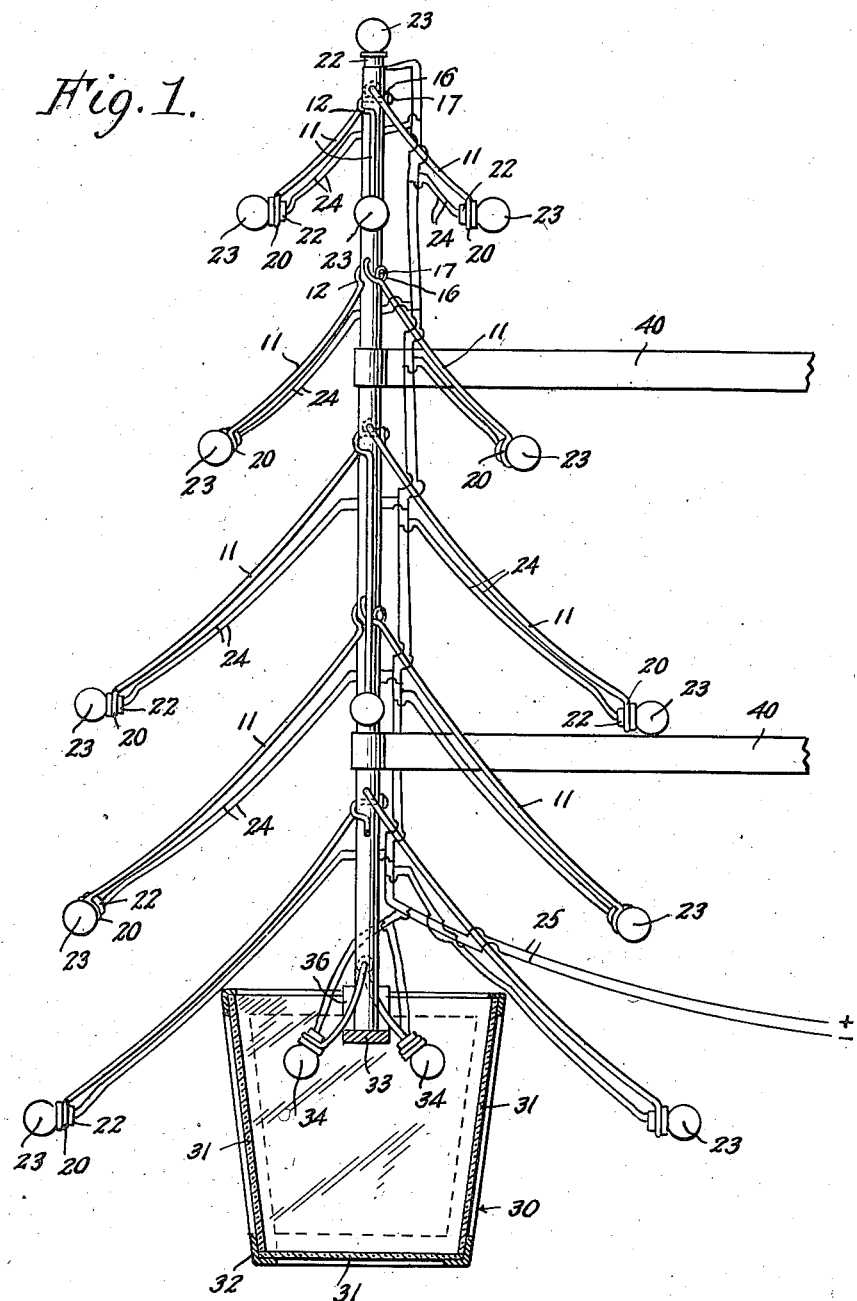
Fig. 1 is a side view of an artificial tree frame with the lamps applied thereto, the lamp wiring being illustrated diagrammatically and with the base shown in section.

Referring to the drawings by characters of reference, the artificial tree includes a vertical trunk 10 and curved branches 11 which are connected with the trunk for movement of the branches from a downwardly curved active position extending radially outward from the trunk, to an inactive collapsed position extending longitudinally thereof in order to reduce the overall size for facilitating storage and shipment.

The branches may be arranged in any desired manner, but as illustrated the same are preferably arranged in vertically spaced groups with the branches in each group spaced apart circumferentially substantially equal distances and staggered with reference to the branches in adjacent groups. The groups of branches each consists of a plurality of pairs of branches, and as illustrated, each group consists of two pairs with the branches in each pair extending radially outward in opposite directions. One of the branches of each pair is provided with a laterally offset inner end portion 12 having an angulated terminal 13 which is arranged in and protrudes through a transverse opening 14 in the trunk 10 to thereby pivotally connect the branch thereto and to dispose the offset portion 12 in partially surrounding relation with the trunk and into engagement with the trunk forwardly of the pivotal connection therewith for positioning the branch in downwardly extending radial relation and for limiting the movement of the branch from the inactive collapsed position extending longitudinally thereof to active outwardly projecting radial relation.

The other branch of each pair is formed with a laterally offset inner end portion 15 having an eye 16 at the inner end thereof which is fitted over the protruding outer end of the angulated terminal 13 of the mating branch of said pair and secured thereon by any desired means, such as by riveting or peening over the end of the angulated terminal 13 to provide a head 17. This disposes the offset inner end portion 15 in partially surrounding relation with the trunk and into engagement therewith forwardly of the pivotal connection with the terminal 13 so as to limit the movement of the branch from the inactive collapsed position extending longitudinally thereof to the active outwardly projecting relation.

The outer end of each of the branches 11 is provided with a split looped terminal 20 arranged in a plane at an angle to the axis of the branch and which is preferably formed integral with the branch and with the extremities of the looped terminal spaced apart to provide a split portion 21. The looped terminals 20 are adapted to receive sockets 22 for electric lamps 23 and said sockets have conductor wires 24 leading therefrom for connection with main conductor wires 25 leading from a source of supply and extending longitudinally of the trunk 10, it being understood that the lamps are arranged in parallel in the wiring system. In addition to those supported at the terminals of the branches, a lamp socket 22 and lamp 23 are carried by the upper end of the trunk. The conductor wires have adhesive tape wrappings 26 spirally wound about the conductors and the branches and trunk for securing the conductor wires thereto and provide an insulating covering thereover. The branches and trunk may also be covered with any suitable light reflecting decorative or ornamental means 27 such as radially disposed metal foil spines simulating evergreen needles.

The ornamental tree is provided with a base, indicated generally by the reference character 30, which is of hollow formation and includes bottom and side walls 31 of transparent or translucent material secured to a frame 32 having a cross bar 33 attached to the lower end of the trunk 10. The base 30 is illuminated from within by means of electric lamps 34, the sockets 35 of which are carried by the free ends of arms 36 pivotally connected with the lower portion of the trunk to permit of the swinging of the lamps upwardly outside of the base for replacement thereof.

The artificial tree may be supported in any desired manner, but as illustrated, brackets 40 are secured in vertically spaced relation to the trunk and extend laterally therefrom for connection with a street light post or standard, or other suitable support.

Under the foregoing construction and arrangement, an ornamental artificial tree structure has been devised in which the connection between the trunk and branches is such as to provide a strong and durable hinge connection so as to insure maximum safety and provide minimum wind resistance when used outdoors.

What is claimed is:

1. An artificial tree frame including a trunk having longitudinally spaced groups of angularly disposed transverse apertures, groups of branches carried by said trunk for movement thereof from an active position extending radially outward from the trunk to an inactive collapsed position extending longitudinally of the trunk, each group of branches consisting of a plurality of pairs, an angulated terminal at the inner end of one branch of each pair extending through one of the transverse apertures of the trunk and protruding therefrom, and an eye at the inner end of the other branch of each pair fitted over the protruding extremity of the angulated terminal and secured thereon to fulcrum said pair of branches for swinging movement with reference to the trunk.

2. In an artificial tree, a frame including a trunk, vertically spaced groups of branches carried thereby and means of connection between said branches and trunk to permit of the movement of the branches from an active position projecting radially outward from the trunk to an inactive collapsed position extending axially thereof, said means of connection consisting of transversely apertured portions of the trunk, said groups of branches each being composed of a plurality of pairs of branches, one branch of each pair having an angulated inner terminal extending through and protruding from one of said aperture portions of the trunk to fulcrum the branch thereon and the other branch of each pair having an eye at the inner terminal thereof engaging over the protruding end of the angulated terminal of the branch to fulcrum the same to the trunk.

JOHN H. PERONI.